(12) United States Patent
Gillette et al.

(10) Patent No.: US 6,289,606 B2
(45) Date of Patent: Sep. 18, 2001

(54) APPARATUS AND METHOD FOR MOISTURE CONTROL OF PARTICULATE MATERIAL

(75) Inventors: W. John Gillette, Millersville; Paul M. Frank, Bowie, both of MD (US)

(73) Assignee: Novatec, Inc., Baltimore, MD (US)

( * ) Notice: Subject to any disclaimer, the term of this patent is extended or adjusted under 35 U.S.C. 154(b) by 0 days.

(21) Appl. No.: 09/739,770

(22) Filed: Dec. 20, 2000

Related U.S. Application Data (63) Continuation of application No. 09/445,773, filed as application No. PCT/US98/11594 on Jun. 12, 1998, now abandoned.
(60) Provisional application No. 60/049,498, filed on Jun. 13, 1997.

(51) Int. Cl.$^7$ ....................................................... F26B 3/00
(52) U.S. Cl. ................................. 34/472; 34/474; 34/557; 34/80; 34/212; 34/165; 34/169
(58) Field of Search ............................... 34/467, 472, 474, 34/478, 479, 480, 551, 557, 566, 79, 80, 81, 212, 215, 218, 219, 473, 165, 166, 168, 169

(56) References Cited

U.S. PATENT DOCUMENTS

| | | | |
|---|---|---|---|
| 4,413,426 | * | 11/1983 | Graff ........................ 34/473 |
| 4,509,272 | * | 4/1985 | Graff ........................ 34/473 |
| 4,870,760 | * | 10/1989 | Graff ........................ 34/473 |
| 4,974,337 | | 12/1990 | Tavakoli et al. . |
| 5,094,011 | * | 3/1992 | Graff et al. ................. 34/364 |
| 5,172,489 | * | 12/1992 | Moller ....................... 34/472 |
| 5,457,897 | * | 10/1995 | Becker ....................... 34/472 |
| 5,546,673 | * | 8/1996 | Weagraff et al. ............. 34/80 |
| 5,566,468 | * | 10/1996 | Graeff ........................ 34/80 |
| 5,896,675 | | 4/1999 | Holler et al. ................. 34/548 |

FOREIGN PATENT DOCUMENTS 195 31 446   2/1997  (DE) .

* cited by examiner

Primary Examiner—Pamela Wilson
(74) Attorney, Agent, or Firm—Miles & Stockbridge P.C.

(57) ABSTRACT

An apparatus and method for control of moisture content of material such as thermoplastic pellets (80) in a hopper (30) is controlled by supplying dehumidified air from a dessicant bed (90) to the hopper (30) and returning air from the hopper (30) to the dessicant bed (90). A dew point sensor (10) in the return air path determines the moisture content of the material (80) in the hopper (30), and when the dew point drops to a pre-set level, a diverter (134) causes the return air flow to bypass the dessicant bed (90) and to be re-supplied to the hopper (30) without dehumidification. Two dessicant beds are provided, one of which is on-process while the dessicant in the other is regenerated.

15 Claims, 6 Drawing Sheets

APPARATUS AND METHOD FOR MOISTURE CONTROL OF PARTICULATE MATERIAL

CROSS REFERENCE TO RELATED APPLICATION

This application is a continuation of Ser. No. 09/445,773 filed Dec. 13, 1999 abandoned which is a 371 of PCT/US98/11594 filed Jun. 12, 1998 and also claims the benefit of U.S. Provisional Application No. 60/049,498, filed Jun. 13, 1997, which is incorporated herein by reference.

BACKGROUND OF THE INVENTION

1. Field of the Invention

This invention relates to moisture control in a material handling system, and more particularly to an apparatus and method used to control the moisture content of solid particulate material, such as plastic pellets used for making thermoplastic molded articles and extrusions.

2. Brief Description of the Prior Art

A typical system for controlling the moisture content in a particulate bed, for example, supplies moisture-controlled air to the particulate bed and uses a dessicant to dehumidify air returning from the particulate bed.

This system causes very low dew point air to be supplied to the particulate bed. When the material in the particulate bed comprises resins such as certain homopolymer and copolymer polyamides and some polyesters (e.g., nylon 6 and 6.6), the resins may be over-dried undesirably. Some moisture content is required to maintain desired impact resistance and flexibility in finished products produced from the resins.

A prior approach to the over-drying problem proposed to sense the moisture content of air being supplied to a particulate bed and to inject moisture-containing compressed air into the particulate bed as necessary. But this approach has certain disadvantages.

Therefore, a need has continued to exist for a method and apparatus for accurately maintaining a desired level of moisture in a particulate bed by removing unwanted, excessive moisture from the particulate bed without lowering the moisture content to an undesirable level.

SUMMARY OF THE INVENTION

Accordingly, it is an object of this invention to provide an apparatus and method for controlling the moisture content of a material, such as plastic pellets in a particulate bed, without lowering the moisture content to an undesirable level.

Further objects of the invention will be apparent from the description of the invention which follows.

In accordance with one of the broader aspects of the invention, an apparatus for controlling the moisture content of a material in a material handling system comprises a supply gas flow path to supply moisture-controlled gas to the material handling system; a return gas flow path to extract gas from the material handling system; a dehumidifying system having a first gas flow path including a dryer and a second gas flow path devoid of a dryer; and a selector to alternatively connect one of the first gas flow path, the second gas flow path, and both of the first and second gas flow paths between the supply and return gas flow paths to thereby provide a closed-loop circuit of moisture-controlled gas to control the moisture content of the material.

In accordance with another of the broader aspects of the invention, a method for controlling the moisture content of material in a material handling system uses a dehumidifying system having a first gas flow path including a dryer and a second gas flow path devoid of a dryer. The method comprises providing a supply gas flow path to supply moisture-controlled gas to the material handling system; providing a return gas flow path to extract gas from the material handling system; and alternatively connecting one of the first gas flow path, the second gas flow path, and both of the first and second gas flow paths between the supply and return gas flow paths to thereby provide a closed-loop circuit of moisture-controlled gas to control the moisture content of the material.

DETAILED DESCRIPTION OF PREFERRED EMBODIMENTS

Figure 1:
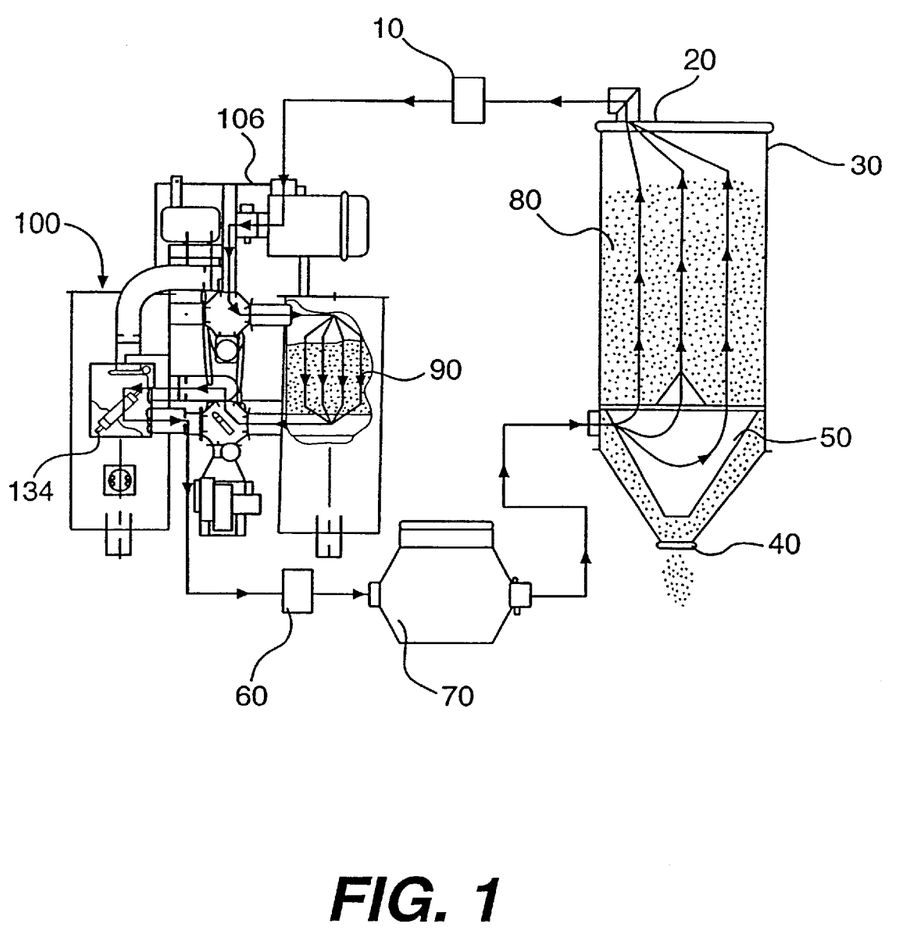
FIG. 1 is a schematic diagram showing process air flow in accordance with the invention when air returning from a feed hopper is dehumidified.
Figure 2:
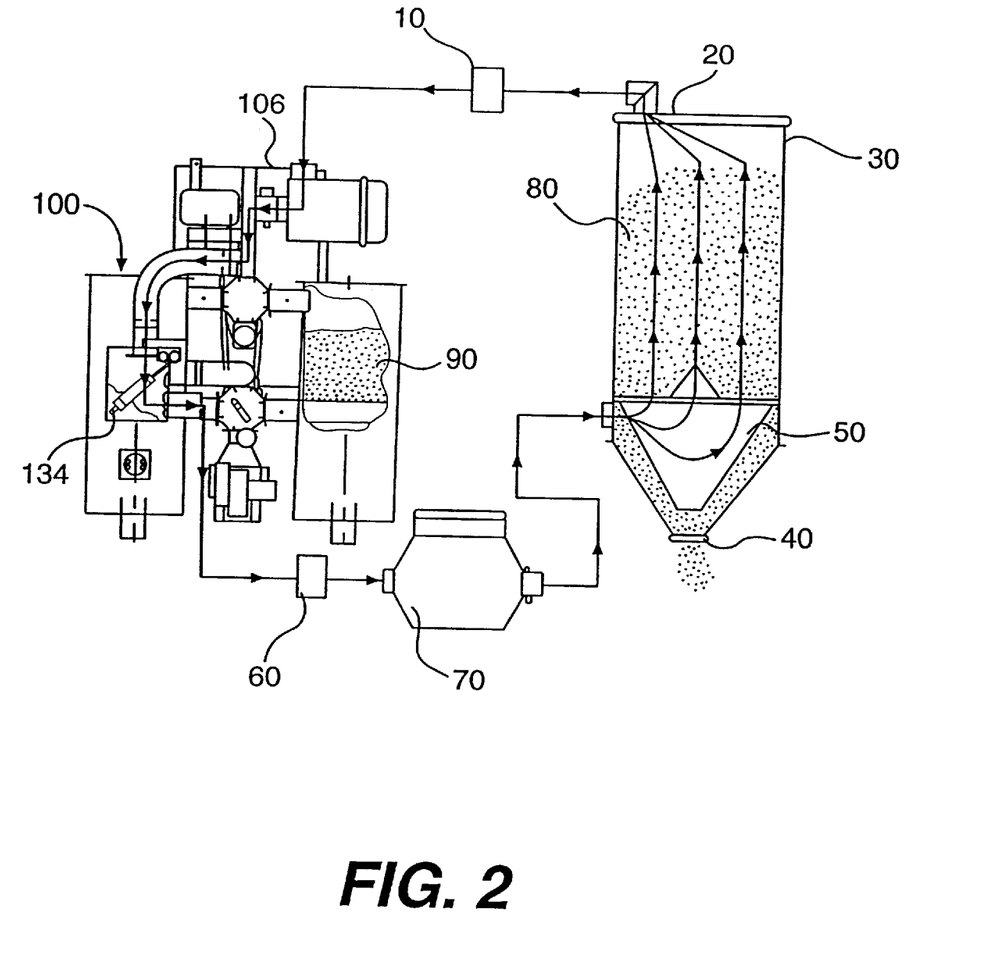
FIG. 2 is a schematic diagram showing process air flow in accordance with the invention when air returning from the feed hopper is not dehumidified.
Figure 3:
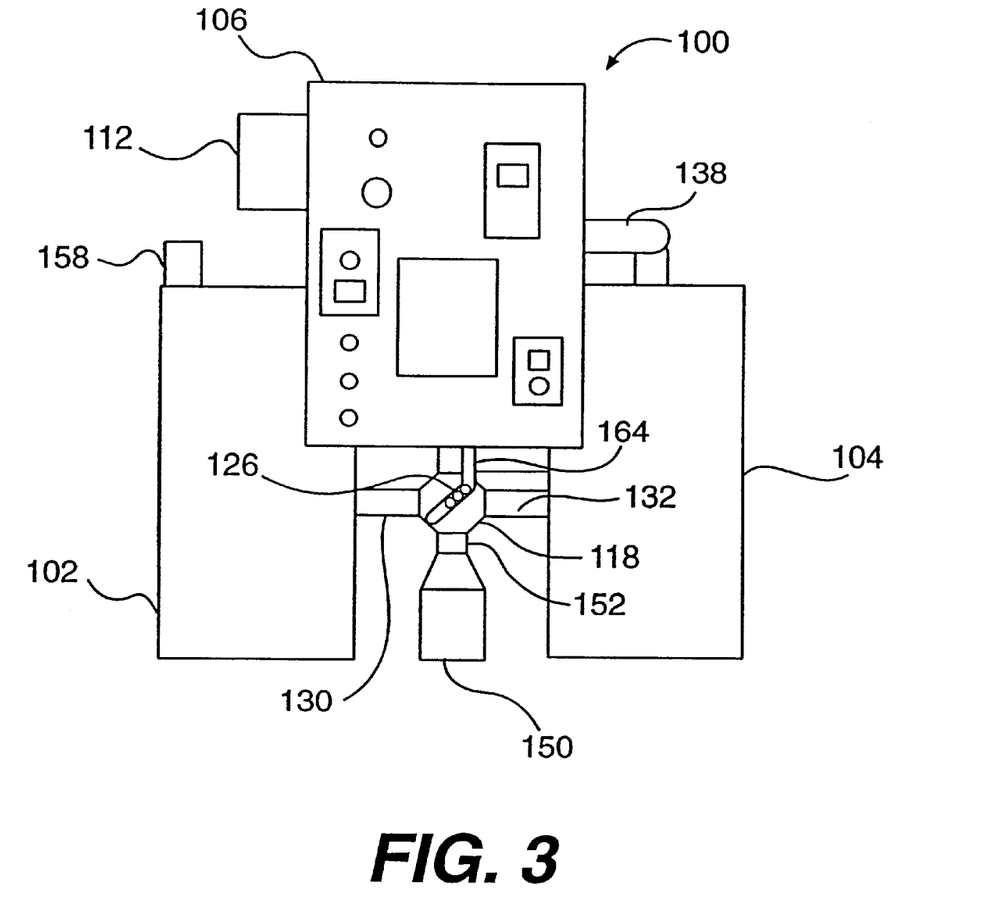
FIG. 3 shows a front elevational view of dehumidifying apparatus of the invention.
Figure 4:
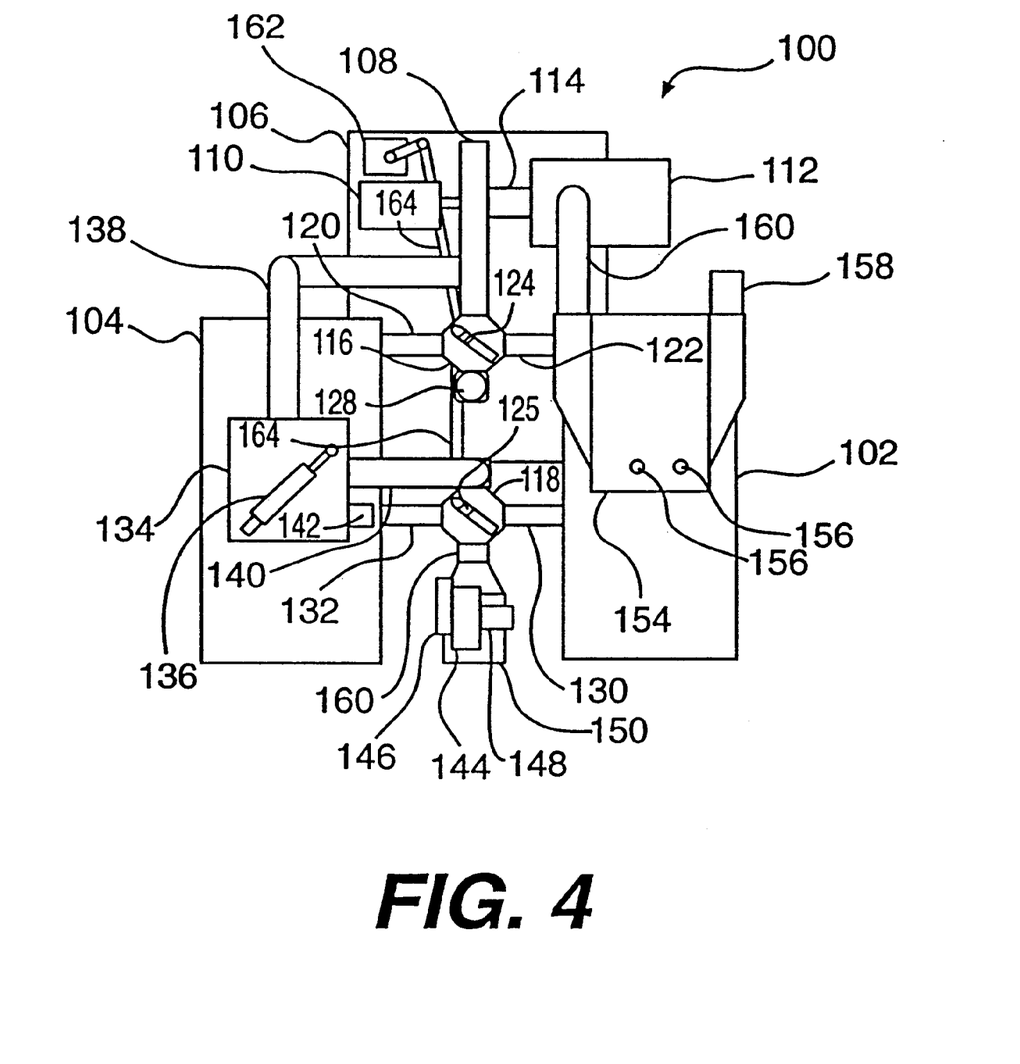
FIG. 4 shows a rear elevational view of the dehumidifying apparatus of the invention.
Figure 5:
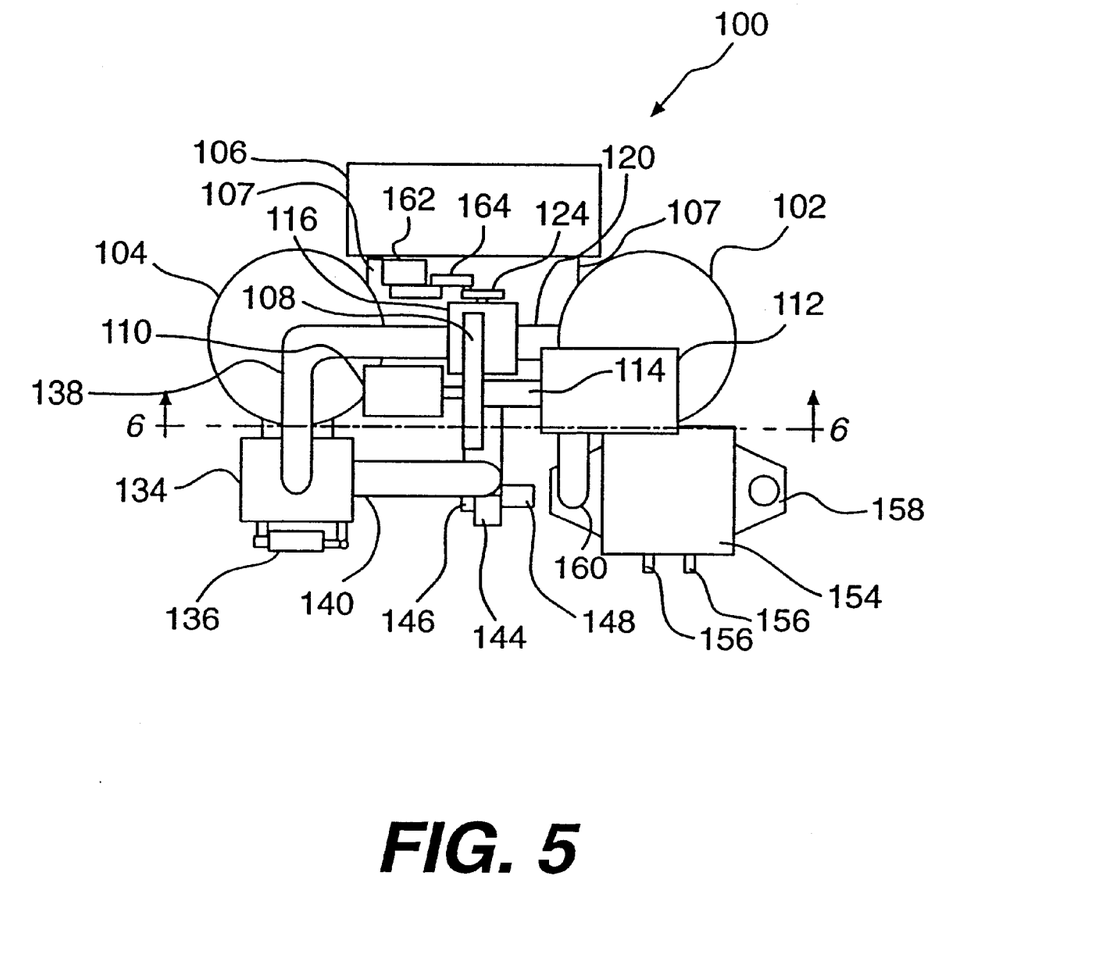
FIG. 5 shows a top view of the dehumidifying apparatus of the invention.
Figure 6:
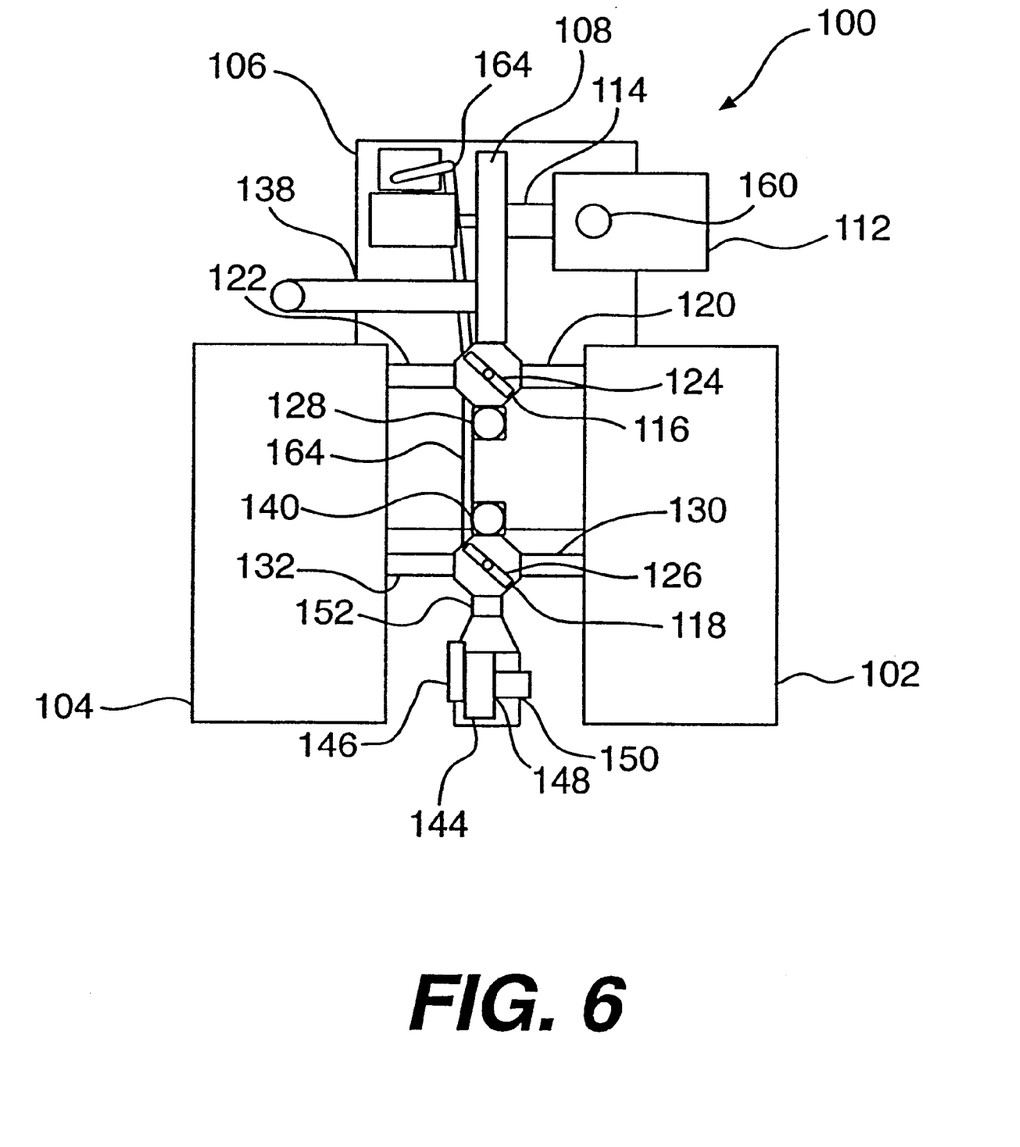
FIG. 6 shows a rear elevational sectional view of the dehumidifying apparatus of the invention taken along the line 6—6 in FIG. 5.

According to one aspect of the invention, as shown in FIGS. 1 and 2, a stream of air of controlled humidity from a dehumidifying apparatus 100 is supplied to a feed hopper 30, or like container, containing a bed of particulate material 80, e.g., pellets of a synthetic thermoplastic resin, and is returned to the dehumidifying apparatus 100. The invention is conveniently applied, for example, to controlling the moisture content of pellets of thermoplastic synthetic resin in the feed hopper 30 that are output through a discharge outlet 40 to a thermoplastic molding machine or extrusion apparatus (not shown).

Dehumidified air (process air) is supplied to the feed hopper 30, typically near the bottom, and passes through an air diffuser 50, e.g., a spreader cone, and through the bed of particulate material 80, taking up moisture from the particulate material. The process air is then returned to the dehumidifying apparatus 100 where its moisture content is reduced by passage through a dryer, namely a bed of dessicant 90. (As later described, the invention employs two dessicant beds, alternately.) The air passing through the dehumidifying apparatus is then re-supplied to the feed hopper 30 after passing through an inlet air heater 70, which heats the air from the dehumidifying apparatus to a temperature selected in accordance with the type of particulate material. The air heater may be an electric unit or an indirect, gas-fired unit.

The moisture content in the particulate material 80 in the feed hopper 30 is determined by monitoring the humidity (or dew point) of the return air leaving the hopper. A suitable dew point or humidity sensor 10 located in an exit conduit (not shown) of the hopper provides a signal to control circuitry in a control box 106 of the dehumidifying apparatus 100. The control circuitry may include a PLC processor. As the moisture level in the particulate material 80 decreases, the dew point of the return air from the feed hopper 30 also decreases. When the dew point of the return air decreases to a value corresponding to a lower acceptable limit of moisture in the particulate material 80, the control circuitry of the dehumidifying apparatus 100 moves a diverter (selector) valve 134 to a bypass position.

As shown in FIG. 2, the stream of process air then bypasses the dessicant bed 90 and is re-supplied to the feed hopper 30 without dehumidification. Because the process air does not pass through the dessicant bed, moisture will not be removed from the process air, and the process air will absorb little or no moisture from the particulate material (or may even add moisture), depending on the state of equilibrium between the process air and the particulate material 80. The dew point of the process air will increase as additional moisture-bearing particulate material is inserted at the top 20 of the hopper to replace particulate material 80 discharged from outlet 40 at the bottom, and as humid environmental air invades the system.

When the dew point of the return air increases to a value corresponding to a pre-selected upper limit of moisture content of the particulate material 80, the control circuitry repositions the diverter valve 134 to again permit the process air stream to pass through the dessicant bed 90.

To achieve optimum dryness for a particular material, the operator can conveniently set a recommended dew point so that the diverter valve is actuated appropriately. In practice, for example, a dew point sensor has a predetermined dew point range (e.g., 0 degrees F. to −40 degrees F. (−17.8 C. degrees to −40 C. degrees)) and the operator selects an appropriate value in that range. The operator also selects an appropriate drying temperature. Once an appropriate drying temperature is selected, the air heater 70 is controlled to regulate the temperature, using a temperature sensor (not shown), e.g., a thermocouple. A dew point sensor 60 is preferably provided between the outlet of the dehumidifying apparatus 100 and the air heater 70. However, the dew point sensor 60 could be located elsewhere in the supply air flow path.

Details of the dehumidifying apparatus 100 of the invention will now be described with reference to FIGS. 3–6, wherein the reference numerals refer to the same elements in all the figures. The skilled practitioner will realize that the drawings are intended to illustrate principal parts of the invention and not to show conventional structural members in detail. Such structural members are shown in more detail in the engineering drawings in the aforementioned provisional application No. 06/049,498.

The dehumidifying apparatus 100 of the invention comprises two dessicant towers 102 and 104, only one of which is used, i.e., "on-process," at a given time. The on-process dessicant bed is monitored and automatically regenerated when the dessicant nears saturation, and the other bed, which has been regenerated is brought on-process.

A control box 106, which includes control circuitry for the system, is mounted between and supported on dessicant towers 102, 104 by brackets 107. The front panel of the control box 106 supports the displays and controls for the operating parameters of the system. The displays preferably show all major component functions, including temperature settings, dew points and other process variables, in a graphic, schematic format. The values of the operating parameters may also be provided to an external communications port. The apparatus is also preferably provided with a fail-safe over-temperature alarm and dryer shut-down controls.

In operation, return air enters the dehumidifying apparatus 100 through inlet 158 and passes through a process air cooler 154, which is preferably provided in this embodiment.

The process air cooler 154 contains a cooling coil, typically cooled by circulating cool water through inlet and outlet connections 156. This cooling coil in the return air line lowers the temperature of the moisture-laden return air before it enters the dessicant, so that the dessicant may perform effectively. However, the process air cooler 154 can be omitted if the return air in a particular system is already cool enough.

After passing through the cooler 154, the process air then passes through a filter unit contained in a housing 112. The filter unit can include a high-efficiency air filter to trap entrained dust particles. Optionally, for very dusty materials, a cyclonic filter, which can trap particles as small as one micron in diameter, can be added. The process filter units may have monitors to signal when filter cartridges need to be cleaned and replaced. After passing through the filter unit, the process air passes through an air conduit 114 to a process air blower 108 driven by a motor 110.

In a normal dehumidifying operation, the process air passes from the blower 108 into an upper 4-way valve 116, which directs the air into the on-process dessicant bed in one of the dessicant towers 102 or 104, through one of air conduits 122 or 120, respectively. The state of the valve 116 is adjusted by the actuator arm 124. For clarity of illustration, actuator arms are shown on each side of the 4-way valve. However, it will be understood that such an actuator arm is actually needed only on one side of the valve.

The process air passes downward through the on-process dessicant bed to the bottom of the bed, which is located at about the level of the air conduits 130 and 132. The dessicant beds in the illustrated apparatus fill only the upper portion of the dessicant towers 102 and 104, the lower portion of the towers being provided for mechanical support. The process air then passes through the appropriate conduit 130 or 132 to a lower 4-way valve 118.

The state of the lower 4-way valve 118 is adjusted by its actuator arm 126 (shown duplicated for clarity of illustration). From the lower 4-way valve 118, the dehumidified air passes through conduit 140 to diverter valve 134.

In the normal dehumidifying operation, the diverter valve 134 is positioned, e.g., by an actuating air cylinder 136, to direct the process air to the outlet 142, from which it proceeds to a material handling apparatus, such as the feed hopper 30 containing the pellets to be dried. After passing through the feed hopper 30, and absorbing moisture from the particulate matter therein, the process air returns to the dehumidifying apparatus 100 through a conventional return air conduit (not shown).

The humidity or dew point of the process air leaving the hopper 30 is measured by a sensor 10 as described previously. The sensor 10 is preferably located at the hopper, but may be located in the return air conduit or at the inlet to the dehumidifying apparatus 100.

The circuitry in the control box 106 senses when the dew point signal from the sensor 10 has fallen to a value corresponding to the desired lower limit of moisture content for the particulate material as described previously. At this time, the circuitry in the control box 106 actuates air cylinder 136 to reposition the diverter valve to a state which blocks air coming from a dessicant bed via conduit 130 or 132 and the lower 4-way valve 118, and opens air conduit 138 from the process air blower 108 to the diverter valve 134. Alternatively, the diverter valve may prevent air from entering a dessicant bed, or two diverter valves may be used to block air entering and leaving a dessicant bed.

The return air from the hopper 30 bypasses the dessicant bed in both of the dessicant towers 102, 104 and is sent directly to the outlet 142 of the diverter valve 134, to be reheated and re-supplied to the hopper for another pass through the particulate material.

When the dew point of the air leaving the hopper 30 indicates that the moisture content has reached a predetermined upper limit, the control circuitry is activated to return the diverter valve 134 from its bypass state to its normal dehumidifying state, and the process air is then again dehumidified at each pass through the dehumidifying apparatus 100. In this way, the moisture content of the process air (and, e.g., the moisture content of the material in the hopper) is kept within a predetermined range merely by setting the controls on the front panel of the control box 106, under control of the operator.

When the dew point of the air entering the hopper rises to a value that indicates that the dessicant bed is becoming saturated, or on a timed cycle if that is more convenient, the on-process bed in one of the dessicant towers 102 and 104 is switched out of the process air loop and the fresh, off-process bed in the other of the two dessicant towers 102 and 104 is placed on-process. This is accomplished under control of the control circuitry which actuates the 4-way valve actuator 162, which in turn repositions the 4-way valves 116 and 118 through their actuator arms 124 and 126, which are connected to each other and to the valve actuator 162 by mechanical linkages 164. The process air is then directed from the blower 108 through the other of the dessicant towers 102 and 104, and the air so dehumidified is sent to the particulate material.

In order to regenerate or freshen the dessicant in the off-process dessicant tower 102 or 104, a regeneration cycle may be performed in the following manner.

First, during a heating period, moisture is released from the off-process dessicant bed. Environmental air enters through a regeneration air filter unit in a regeneration air filter housing 146. The regeneration filter unit may have a monitor to signal the need for cleaning or replacing a filter cartridge. Air passing through the regeneration filter unit is moved by a regeneration air blower 144, driven by a motor 148, through a regeneration air heater housing 150. The heater housing 150 is preferably externally mounted to allow easy access for maintenance.

A heating element, e.g., a coil, within the heater housing 150 warms the regeneration air so that the moisture adsorbed by the dessicant bed can be released. The heated regeneration air then passes from the heater housing 150 through conduit 152 to the lower 4-way valve 118, which directs the regeneration air into the off-process bed through the appropriate conduit 130 or 132. The heated regeneration air passes upward through the dessicant bed to release the adsorbed moisture therein by thermal regeneration.

The moist regeneration air then leaves the off-process bed through the appropriate upper conduit 120 or 122 to the upper 4-way valve 116. The moist regeneration air is then discharged to the environment through the regeneration air outlet 128 on the lower port of the upper 4-way valve 116. Appropriate sensors can be incorporated into the regeneration loop to control the temperature of the regeneration air.

After the heating period, the regeneration cycle preferably has a dynamic cooling period during which the heater is turned off and the blower 144 is left on. Finally, the blower 144 is turned off to provide static cooling, thus permitting a smooth shift between the on-process and off-process beds.

The method and apparatus of the invention provide a convenient way to control the humidity of particulate material such as pellets of thermoplastic molding or extrusion resins, within a desirable predetermined range.

While preferred implementations of the invention have been shown and described, it will be apparent to those skilled in the art that changes can be made without departing from the principles and spirit of the invention, the scope of which is defined by the appended claims.

For example, components such as the process air blower can be mounted on a floor stand near the material handling hopper if the dryer is some distance from the hopper.

Also, a single air drying unit can also serve as a central dehumidifying system to deliver unheated, controlled dew point air to one, or several, remote heater/blowers on one, or several, hoppers, each with an individually set drying temperature. The dehumidifying apparatus of the invention can also serve as a source of dry air for air conveying systems that use the air as a conveying medium to distribute materials to one, or several, different molding or extrusion machines, for example.

Although the diverter valve is positioned by an air cylinder in the foregoing description, the diverter valve could be positioned by other means, such as a hydraulic cylinder or a gear motor. If, e.g., a gear motor is employed, the diverter valve can be used to provide a modulated supply of air from a dessicant bed and air returning from the particulate material. That is, air that is dehumidified in the dessicant bed can be mixed with the moist air returning from the particulate material in a manner that more precisely controls moisture content of the air supplied to the particulate material. In such a system (and others), signals from both sensors 10 and 60 can be used for control.

What is claimed is:

1. An apparatus for controlling the moisture content of material in a material handling system, comprising:

a supply gas flow path to supply moisture-controlled gas to said material handling system;

a return gas flow path to extract gas from said material handling system;

a dehumidifying system having a first gas flow path including a dryer and a second gas flow path devoid of a dryer; and a selector operative to alternatively connect one of said first gas flow path, said second gas flow path, and both of said first and second gas flow paths between said supply and return gas flow paths to thereby provide a closed-loop circuit of moisture-controlled gas to control the moisture content of the material.

2. An apparatus according to claim 1, further comprising:

a sensor to output a signal based on the moisture content of the material; and control circuitry to cause said selector to operate based on said signal.

3. An apparatus according to claim 2, wherein said sensor is provided in the return gas flow path.

4. An apparatus according to claim 1, wherein said dryer in said first gas flow path includes a dessicant.

5. An apparatus according to claim 4, wherein when said selector connects only said second gas flow path between said supply and return gas flow paths, said selector causes gas flow through said dryer to be blocked.

6. An apparatus according to claim 1, wherein the selector includes a valve.

7. An apparatus for controlling the moisture content of material in a material handling system, comprising:
- a supply gas flow path to supply moisture-controlled gas to said material handling system;
- a return gas flow path to extract gas from said material handling system;
- first and second dessicant towers to remove moisture from the gas extracted from said material handling system;
- a first valve to input the extracted gas to a selected one of said first and second dessicant towers;
- a second valve to output gas from the selected one of said first and second dessicant towers to a third valve; and
- a bypass gas flow path to supply the extracted gas to said third valve and thereby bypass said first and second dessicant towers, wherein said third valve alternately directs, to said supply gas flow path, gas from a selected one or the other of said bypass gas flow path and the output from said second valve and alternately blocks a non-selected one or the other of said bypass gas flow path and said output from said second valve, to thereby provide moisture-controlled gas to control the moisture content of the material.

8. An apparatus according to claim 7, further comprising:
- a sensor, provided in the return gas flow path, to output a signal based on moisture content of the material; and
- control circuitry to control said third valve based on the signal from the sensor.

9. An apparatus according to claim 8, further comprising:
- a sensor, provided in the supply gas flow path, to output a signal based on the dew point of the moisture-controlled gas,
- wherein said control circuitry controls said first and second valves to select the other of the first and second dessicant towers based on the signal from the sensor provided in the supply gas flow path.

10. An apparatus according to claim 9, further comprising:
- a regeneration heater, controlled by said circuitry, to regenerate the dessicant in the first and second towers.

11. A method for controlling the moisture content of material in a material handling system using a dehumidifying system having a first gas flow path including a dryer and a second gas flow path devoid of a dryer, comprising:
- providing a supply gas flow path to supply moisture-controlled gas to said material handling system;
- providing a return gas flow path to extract gas from said material handling system; and
- alternatively connecting one of said first gas flow path, said second gas flow path, and both of said first and second gas flow paths between said supply and return gas flow paths to thereby provide a closed-loop circuit of moisture-controlled gas to control the moisture content of the material.

12. A method according to claim 11, further comprising:
- sensing the moisture content of the material, wherein the alternative connecting is based on said sensing.

13. A method according to claim 12, wherein said sensing senses the moisture content of gas in the return gas flow path.

14. A method according to claim 11, wherein said dryer in said first gas flow path includes a dessicant.

15. A method according to claim 14, wherein when only said second gas flow path is connected between said supply and return gas flow paths, gas flow through said dryer is blocked.

* * * * *